United States Patent
Dean et al.

(10) Patent No.: US 6,771,323 B1
(45) Date of Patent: Aug. 3, 2004

(54) AUDIO VISUAL DISPLAY ADJUSTMENT USING CAPTURED CONTENT CHARACTERISTICS

(75) Inventors: Rick Dean, Bellflower, CA (US); Dave Schnuelle, Los Angeles, CA (US)

(73) Assignee: THX Ltd., San Rafael, CA (US)

(*) Notice: Subject to any disclaimer, the term of this patent is extended or adjusted under 35 U.S.C. 154(b) by 562 days.

(21) Appl. No.: 09/714,599

(22) Filed: Nov. 15, 2000

Related U.S. Application Data

(60) Provisional application No. 60/227,672, filed on Aug. 24, 2000, provisional application No. 60/188,969, filed on Mar. 10, 2000, and provisional application No. 60/165,740, filed on Nov. 15, 1999.

(51) Int. Cl.$^7$ .......................... H04N 5/222; H04N 17/00
(52) U.S. Cl. .......................... 348/722; 348/181; 348/180
(58) Field of Search .................. 348/722, 180, 348/181, 187, 188, 189, 460; 375/224; 324/612, 158.1, 76.11; 455/226.1, 67.11, 67.14, 3.06; 702/85, 108, 117; 725/114, 115, 116, 138, 144, 145, 146; H04N 17/00, 17/02, 5/222

(56) References Cited

U.S. PATENT DOCUMENTS

| | | | | |
|---|---|---|---|---|
| 5,748,229 A | * | 5/1998 | Stoker | 348/180 |
| 6,378,132 B1 | * | 4/2002 | Grandin et al. | 725/146 |
| 6,392,710 B1 | * | 5/2002 | Gonsalves et al. | 348/722 |
| 6,400,411 B1 | * | 6/2002 | Bayes et al. | 348/722 |

* cited by examiner

Primary Examiner—Sherrie Hsia
(74) Attorney, Agent, or Firm—Irell & Manella LLP

(57) ABSTRACT

A technique for managing the production, post-production and distribution of audio-visual projects permits accurate management of production values and thereby allow accurate and measurable reproduction and control. Test signal data is used to assist the operator in insuring the levels are set to the intended display characteristics in the event that factors such as creative lighting or applied effects affect the desired look of the scene. The test signal data may encompass elements that determine resolution, White level, Black level, Grey steps, Frequency response and linearity as well as sound parameters. Chroma channels may exhibit similar signals including a bar pattern that can be used to insure the best colorimetry is maintained. Standard signals may also improve compositing and cross media transfers without extraordinary efforts to match production values.

20 Claims, 15 Drawing Sheets

LANGUAGE &
AUDIO SETUP

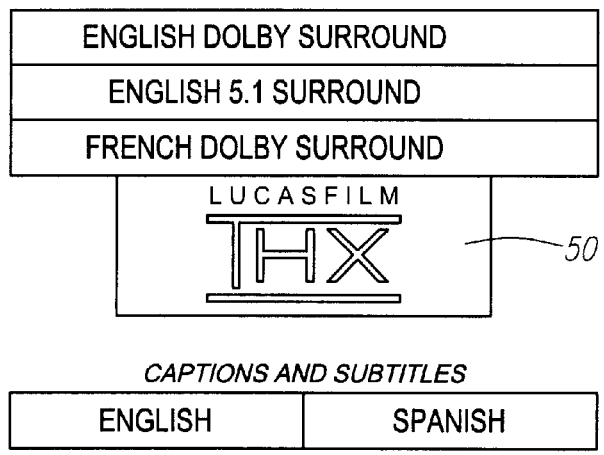

FIG. 6

To optimize your viewing experience of Fight Club, this section of the DVD will help you set up your television and audio system Choose a set of tests from below and follow the instructions. When you are finished with each video test pattern/audio test signal, chapter skip forward ( ▶▶| ) to the next test signal For more details about using these test signals, please visit the THX website a http://www.thx.com

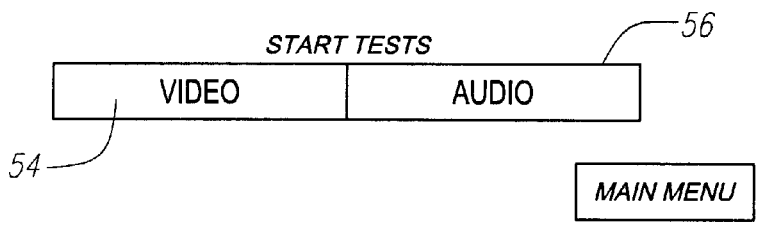

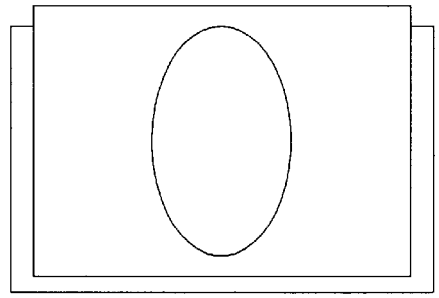

ASPECT RATIO SETUP
using 16:9 2:35 circle

If you see a perfect circle while playing back this test, your DVD player is correctly set to display this 16:9 anamorphic movie If you have a 4:3 television and you see a tall, thin oval, you must stop the DVD player and change the ASPECT RATIO setting to 4:3

If you have a 16:9 television, your display should be set to wide. If you see a flat oval, you must stop the DVD player and change the ASPECT RATIO setting to 16:9. You should see the entire circle; if not, change the vertical sizing of the display.

Hit "PLAY TEST" to start test pattern. Chapter skip forward when finished.

For more details about using these test signals, please visit the THX website at http://www.thx.com

⌐THX *MENU*⌐    ⌐ *PLAY TEST* ⌐    ⌐ *MAIN MENU* ⌐

*FIG. 8*

*TINT & COLOR SETUP*
using SMPTE color bars

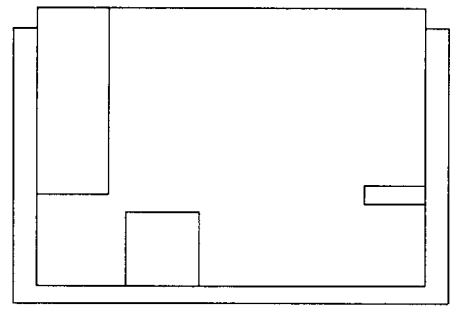

Adjust the Tint setting until the blue squares at the bottom
left-hand corner of the screen are a similar shade of blue Next, adjust the Color setting until the Red rectangle is bright red,
but not blooming or bleeding.

You can recheck Contrast/Picture and Brightness with the white
square and black bars at the bottom of the screen, respectively.

If you have a blue filter, use this test. To receive a blue filter from THX,
visit the THX website at the address below. Instructions on the use of
the blue filter can also be obtained from the THX website.

Hit "PLAY TEST" to start test pattern. Chapter skip forward when finished.

For more details about using these test signals, please visit the THX
website at http://www.thx.com

 *MENU*     ⌐ *PLAY TEST* ⌐     ⌐ *MAIN MENU* ⌐

*FIG. 9*

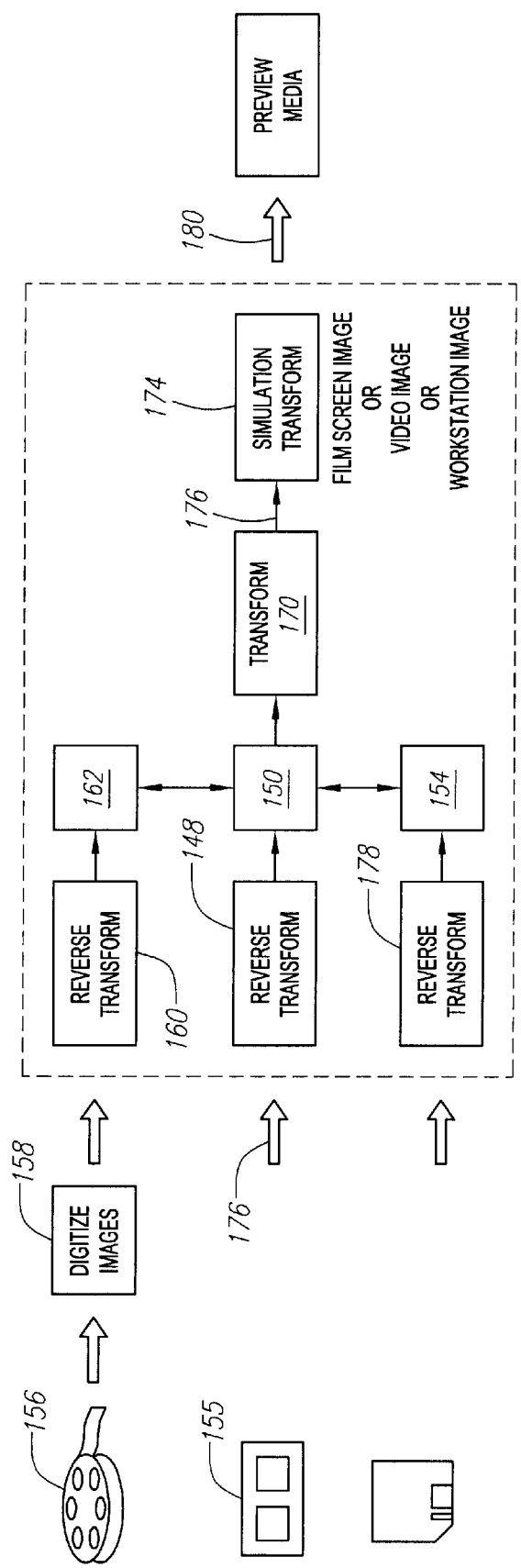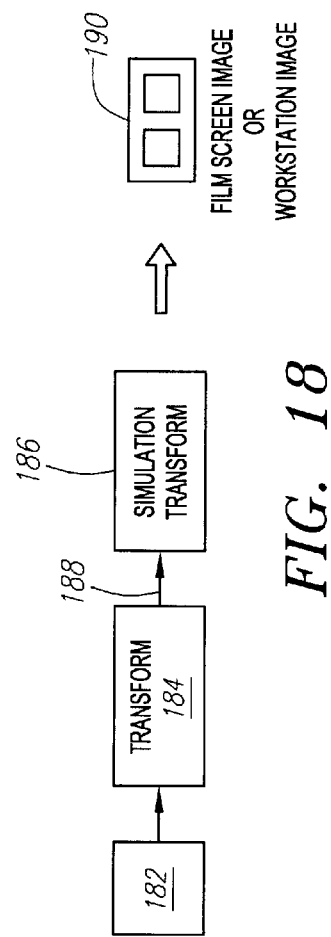
FIG. 17
FIG. 18

AUDIO VISUAL DISPLAY ADJUSTMENT USING CAPTURED CONTENT CHARACTERISTICS

Related Applications

This application claims priority from copending U.S. provisional patent application Ser. No. 60/165,740 filed Nov. 15, 1999, and U.S. provisional patent application Ser. No. 60/188,969 filed Mar. 10, 2000, and U.S. provisional patent application Ser. No. 60/227,672 filed Aug. 24, 2000.

BACKGROUND OF THE INVENTION

1. Field of the Invention

This invention relates to reference information included in captured digital signals, and more specifically to a digital reference information providing a baseline for determining and measuring audio and video signal changes in the post production and display processes.

2. Description of the Prior Art

The move to capture images electronically for cinema productions closely resemble the evolution of television production moving from film to video based capture technologies. Tools developed for both film and video provided the post production processes the ability to restore the original look of the scene by using various tools and procedures. For the film production, a color chart was photographed at the head of each scene to assist in color balance during the film to tape transfer. Video productions may use a color bar reference at the head of the program material to assist in proper set-up of playback levels. Both systems may work for the intended media.

Unlike film, an electronic camera offers the ability to see the result immediately on a picture monitor. Observing recent productions, set lighting and aperture were adjusted based on the image that was displayed on a waveform and picture monitor near the camera. Upon being satisfied that the scene was "correct", the production would proceed and the image recorded on a High Definition Tape recorder. What may be important to the director and cinematographer as far as subtle detail in the shadows and lace curtains in a window may be overlooked in later steps of post-production. Rarely will both detail in shadows, and detail in backlit windows survive together, either one or the other are normally clipped during the post process. But what is needed is test signal data that may reside along with the active picture and or sound data that may identify benchmark image or sound characteristics.

SUMMARY OF THE INVENTION

The present invention may provide a technique for managing the production, post-production and distribution of audio-visual projects to permit accurate management of production values to enable accurate and measurable control. Test signal data may assist the operator in insuring the levels are indeed set to the intended look in the event of any creative lighting applied or effects used that would create an unnatural look to the scene. The test signal data may encompass elements that determine resolution, White level, Black level, Grey steps, Frequency response and linearity as well as sound parameters. Chroma channels may exhibit similar signals including a bar pattern that can be used to insure the best colorimetry is maintained. Standard signals may also improve compositing and cross media transfers without extraordinary efforts to match production values.

In another aspect of the present invention, a test signal may be inserted on an active but unused line of video to track and monitor the video image's signal level and quality throughout the mastering and replication process. The image quality is therefore measurable by referencing this signal. This same model can be applied to audio and Digital Cinema.

When capturing an image with a digital cinema camera, test signal data can be inserted and recorded along with the active picture and sound. This test signal data may serve as a reference for the sound and picture quality and associated technical parameters. The post production process may involve such things as "timing" or changes to color balance and component signal levels in order to produce finely tuned images and sound. At any time throughout the production and post-production processes, one can return a scene to the original image capture levels by referencing the test signal data and adjusting levels to their original state. For scenes used in special effects, the test signal data can be used to control levels and maintain continuity between like scenes and composited images. Certain automated functions could be implemented in conjunction with the test signal data in much the same way as VIRS works in consumer television today to control signal levels between the origination site and the local broadcast station.

Applications of this test signal data in the creation of the digital master may include:
  Creation of the High Definition or Super High Definition Digital Master;
  From Digital source to Digital
  From Digital source to Film
  From Film source to Digital It should be possible to integrate the test signal data generator into the recording device on the set, therefore eliminating the need for a separate piece of equipment to generate the test signal data.

In a still further aspect of the present invention, test signals may be added to entertainment distributions such as analog media, digital media and optical media. The test signals may be used to align the home entertainment system of a user to reproduce the intended theatrical performance.

In another still further aspect of the present invention, test signal data may be added to entertainment venue distributions using analog media, digital media and transmissions, and optical media and transmissions however distributed. The test signal data may be used to align the venue entertainment system to reproduce the intended performance and one or more feedback channels may provide the distributor or creator information or control of the characteristics of a performance.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 6 is a test election menu according to the present invention.

FIG. 7 is a test selection menu according to the present invention.

FIG. 8 is an aspect test window according to the present invention.

FIG. 9 is a tint and color test window according to the present invention.

FIG. 17 is a block diagram of the steps of the present invention showing the process of simulation of a target image format.

FIG. 18 is a block diagram of the output and simulation steps of the present invention.

DETAILED DESCRIPTION OF THE PREFERRED EMBODIMENT(S)

Figure 1:
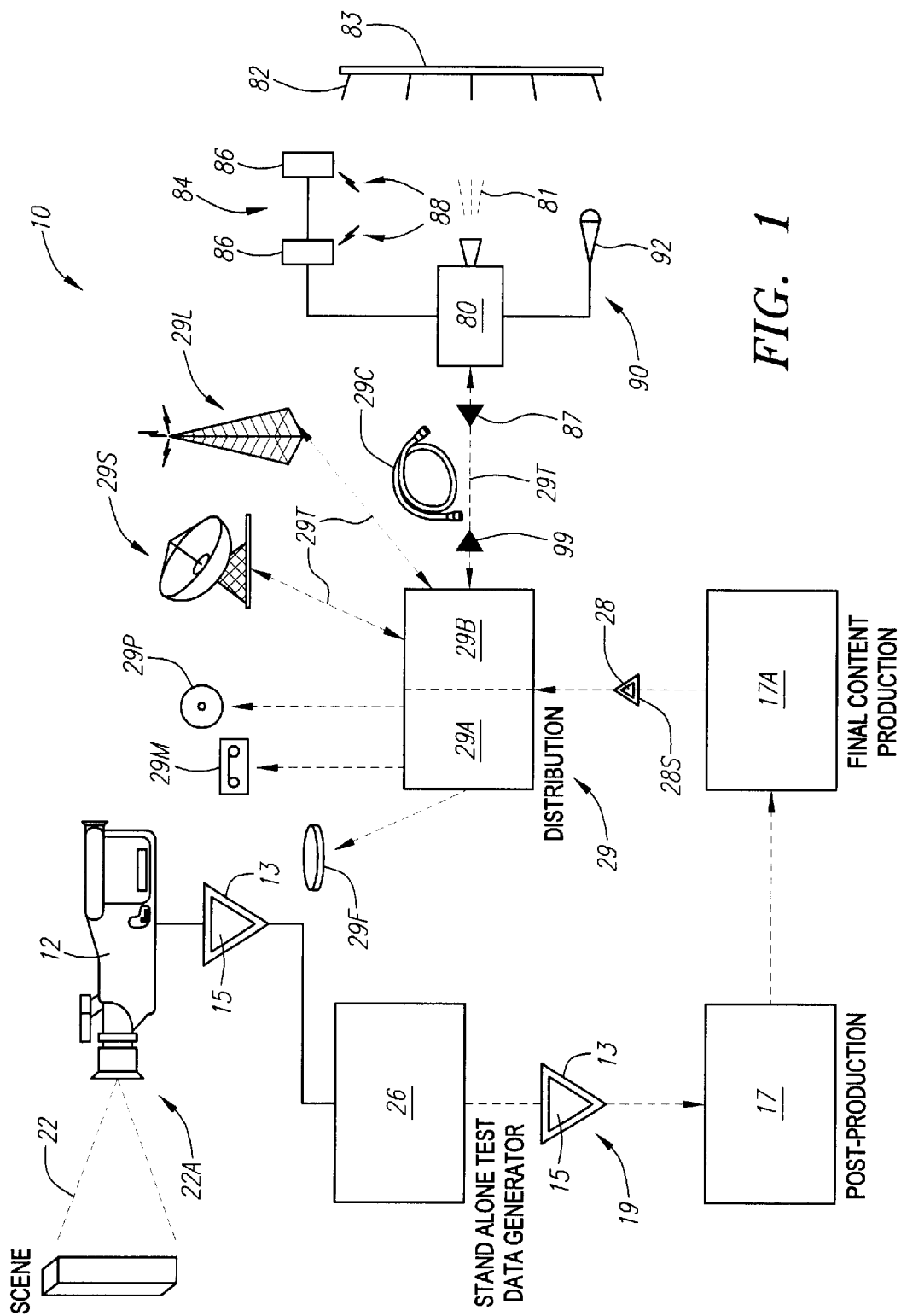
FIG. 1 is a block diagram of a test signal system according to the present invention.

Referring now to FIG. 1, a digital cinema system 10 according to the present invention may include image capture device 12 which may produce image data 13 which may also include test data 15. Image data 13 may be used directly in post-production 17 or it may be included with test data 15 which may be produced by image capture device 12 or stand alone test data generator 26. Image data 13 and test data 15 comprise enhanced data 19. Enhanced data 19 may be used in post-production 17 to allow greater control during final content production 17A of final content 28. Images such as image input 22 may be manipulated by post-production 17 using test data 15 to provide a base line for original image characteristics 22A. Final content 28 may be distributed by distribution 29. Distribution channel 29A may be directed to provide final content 28 through film 29F, magnetic media 29M, or optical media 29P. Additionally, distribution channel 29B may be directed to provide final content 28 through satellite link 29S, broadcast link 29L, or cable link 29C. Distribution channel 29B may also provides a two-way link 29T through each distribution channel providing a feedback channel for feedback signal 87.

Final content 28 shown in FIG. 1 may be provided to distribution outlet 90 through two-way link 29T. Final content 28 may be provided to projector 80 for display on screen 83. Sound component 28S of final content 28 may be provided to sound network 84 that may include individual sound reproduction devices 86. Distribution outlet 90 may also include feedback sensor 92 to monitor displayed images 82 and or reproduced sound 88.

Figure 2:
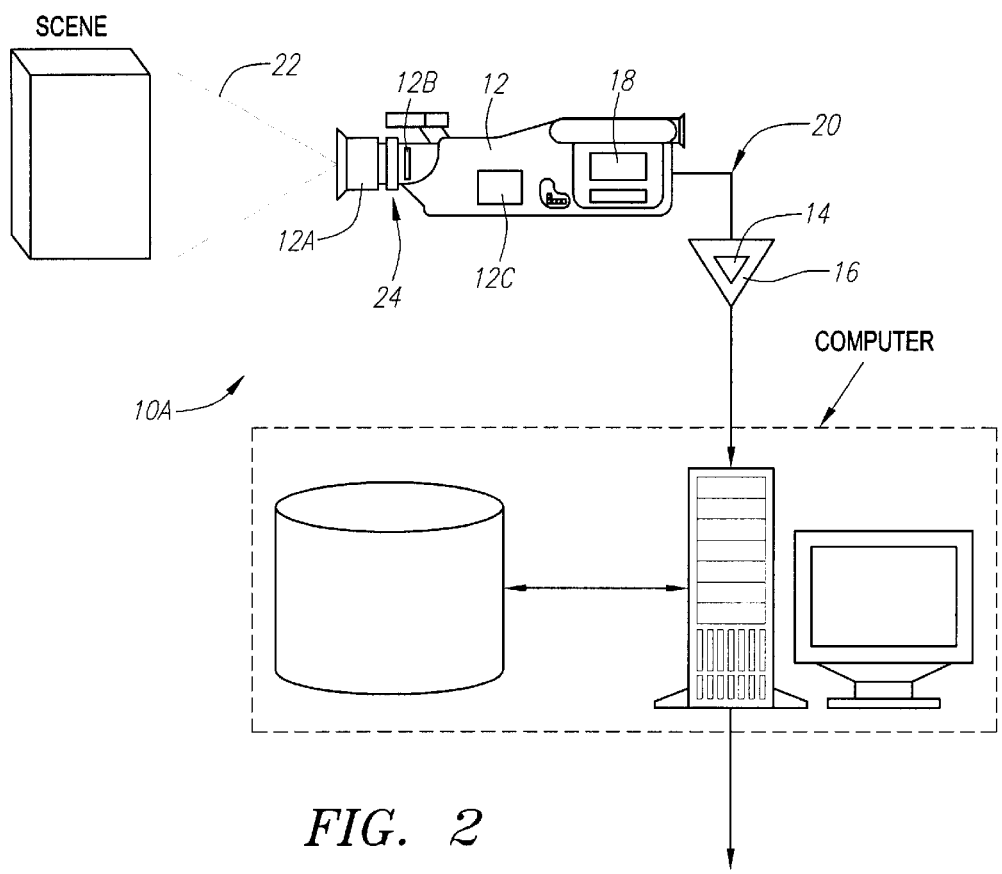
FIG. 2 is a detail block diagram of a test signal system input according to the present invention.

Referring to FIG. 2, a digital cinema input system 10A according to the present invention may include digital image capture device 12 and test signal 14. Test signal 14 may be added to conventional video signal 16 by signal generator 18 included within image capture device 12. Test signal 14 may enable optimization of image input 22. Because test signal 14 is added to video signal 16 at or immediately after image capture point 24, subsequent changes to original image signal may be quantified and or eliminated. Signal generator 18 may also be a stand alone device or it may also be included in a conventional device along data stream 20. Test signal 14 may also include information on image capture device 12 such as characteristics of optics 12A or video chip 12B or of image software 12C.

Figure 3:
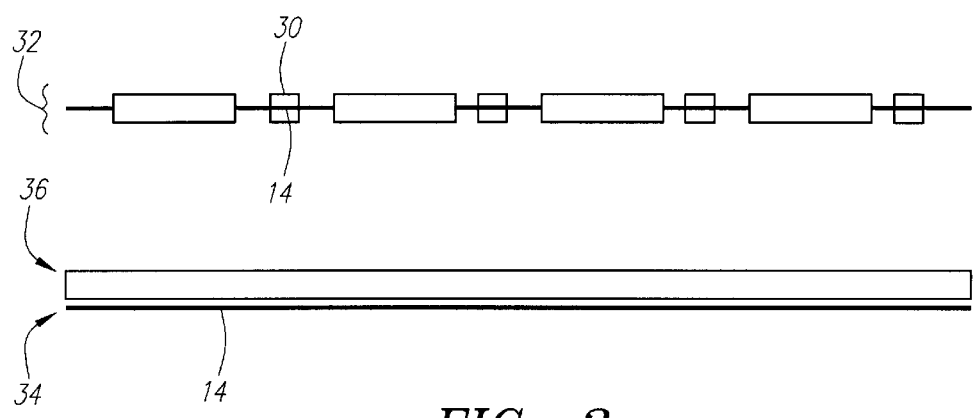
FIG. 3 is graph of a test signal according to the present invention.

Referring now to FIG. 3, test signal 14 may be included in vertical blanking elements 30 of composite signal 32. Signal 32 may be an NTSC or HDTV or similar signal. In another aspect of the present invention, test signal 14 may use available bandwidth 34 of video signal 36. Test signal 14 may also comprise one or more file elements of a digital image file.

Figure 4:
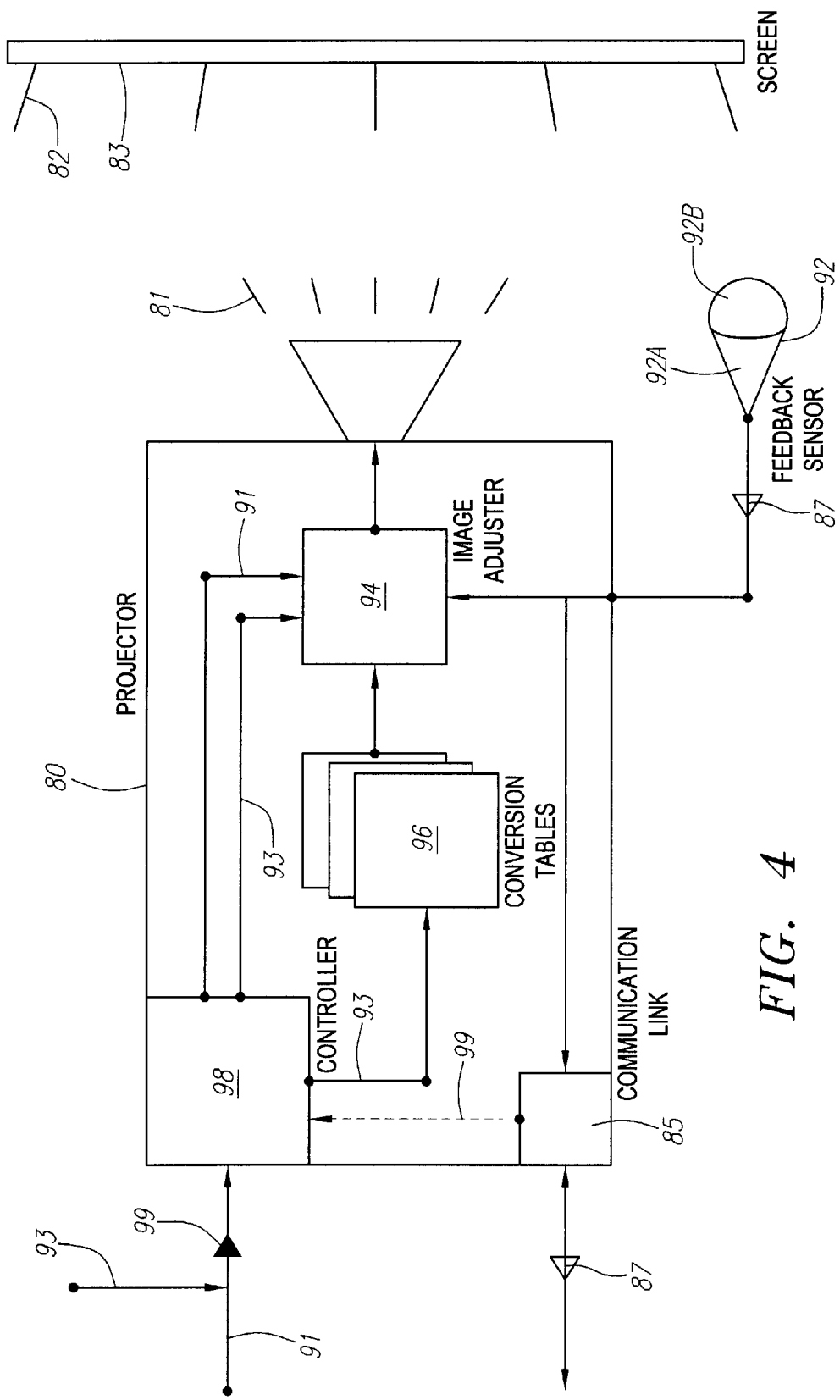
FIG. 4 is a detail block diagram of a test signal system output according to the present invention.

FIG. 4 depicts a preferred embodiment of the present invention, comprising a digital image projector 80 projecting projected images 81 onto screen 83 to be reflected as images 82 to be viewed by a viewer (not shown). Screen 83 may be any type of screen known in the art, including the type used in commercial movie theaters, conference halls, or home theaters.

Projector 80 may include controller 98 to receive image data signal 99. Controller 98 may be comprised of software, hardware, or a combination of software and hardware. Furthermore, an analog to digital converter is required to digitize the feedback sensor 92 (see discussion below) output voltage for analysis. Image data signal 99 may include image data 91 and metadata 93. Metadata 93 may include information regarding the image data, including color, luminance, and brightness information, that defines the proper display parameters for the image data. Metadata 93 may be combined with image data 91 to form image data signal 99 during the recording process, or later during the mastering process or even prior to transmitting the image data to projector 80 for display. The purpose of the metadata is to provide a baseline reference against which images 82 as actually presented to a viewer can be compared.

The metadata may include further information, such as information uniquely identifying the images (e.g. movie) being displayed, the source of the images, the intended receiver of the images, and payment or other transactional and/or financial information. The metadata may also include information identifying predefined characteristics, such as a particular color space, to properly display image data 91 so as to generate displayed images 82 as originally intended by the creator of the images (e.g. film director).

Controller 98 receives image data signal 99 and extracts and separates image data 91 and metadata 93. Projector 80 may further include image adjuster 94 to adjust image data 91 in accordance with metadata 93. Image adjuster 94 may be comprised of a software, hardware, or combination software/hardware digital matrix to manipulate the image data in accordance with the metadata to create images 81.

Projector 80 may further include conversion tables 96. The conversion tables may contain different predefined color profiles to adjust incoming image data 91 in accordance with a particular, pre-selected purpose. Thus, conversion tables 96 may contain color profiles defining different color spaces within which image data 91 may have been originally created. The conversion tables may further contain color profiles defining different "moods" or other image characteristics that can be used to ensure that displayed images 82 have the look originally intended by the creator of image data 91, and thus provide for a method to ensure the preservation of the artistic integrity and intent of the image data. One additional possible use of the conversion tables is to provide for different uses of the display venue (movie theater, auditorium, bar/dance club, home theater), e.g. contain different settings for displaying movies, video clips during a presentation, videos during a party, etc. Conversion tables 96 are thus not limited to containing solely color information, but may also contain, among other information, luminance and light level settings, as well as information relating to settings within the venue such as ambient light settings.

Conversion tables 96 may also contain information related to processing the sound tracks included in image data 91. Thus, in an alternative embodiment, a hardware or software-based utility may be provided that uses real-time or off-line analysis of the data stream, or data encoded during program origination, to provide a control signal to set the gain, or restrict the bandwidth of the audio tracks, so that audible distortion or damage to the amplifier or speakers at high listening levels is prevented. This feature is thought to be especially attractive and useful within a home theater setting.

Referring now to FIG. 4, projector 80 may further include feedback sensor 92 to detect displayed images 82 as actually reflected by screen 83, and thus as actually seen by a viewer seated in the venue and watching the images on the screen. In its simplest implementation, the feedback sensor can be a single element photo-sensor 92A (CCD or photo-diode) with a simple lens 92B such that the sensor only sees the projection screen. The entire screen can be illuminated for measurements that would reflect the performance of the entire screen on the average. However, feedback sensor 92 may be comprised of any other light-detecting device as known in the art. The feedback sensor may be color-sensitive, and may thus be comprised of a plurality of photocells, each such photocell adjusted to detect one color. Thus, in one embodiment, the feedback sensor may comprise a number of photocells for detecting each of the primary colors, respectively. In another embodiment, feedback sensor 92 may comprise a plurality of photocells, each of which is oriented so as to detect images 82 as reflected by separate, individual sections of screen 83. In this embodiment, feedback sensor 92 may be used to detect variations across the screen.

The feedback sensor, however, may also be a broadband luminance sensor not sensitive to the color of the projected light. The light generated by the projector is composed of Red, Green, and Blue elements, each of which can be shown sequentially. In this method of use, the feedback sensor can measure the light level for each color individually. Subsequent software can calculate the appropriate corrections to be applied to make the projector meet the desired color standard.

Conversely, the screen can be illuminated over distinct portions of the entire screen, so that measurements would characterize the uniformity of screen performance over its entire area. This would allow one to measure shading errors or light falloff on the sides, for instance. It is necessary to generate a test signal for each area that can be related to the sensor measurement at that time. The sensor is not spatially sensitive; the analysis software only knows a specific area because the test signal and the light measurement occurred at the same time.

Resolution can also be measured with a single pixel feedback sensor. A test signal with small detail can be projected that may only appear on the screen if the projector lens is in focus. If projector 80 is out of focus, the small detail will not appear and the screen will be darker. The invention thus also provides a method for adjusting the focus of a projector's lens, which can also be accomplished remotely.

Feedback sensor 92 may also include multi-channel capability such as a combination of video and audio channels.

The feedback sensor is preferably attached to the projector to form a unitary structure therewith, but may also be physically separate and apart from the projector. When the feedback sensor is positioned at the projector, it measures the reflected light from the screen, including the effects of the projection booth port glass and the screen itself. This may be of importance because glass can contain color that may change the spectrum of light passing through it, and theatre screens may turn yellow and darken with age. Anything else in the light path, such as the projection lens itself, may also be taken into account.

Feedback sensor 92 is placed and oriented so as to detect displayed images 82 as reflected off screen 83 and thus as actually seen by a viewer seated in the venue. The feedback sensor may provide feedback signal 87 to image adjuster 94 in response to detecting displayed images 82. Image adjuster 94 may further adjust image data 91 in accordance with feedback signal 87 to account for characteristics of the projector and venue, and thus offset changes to projected images 81 caused by the projector itself, or changes to the reflected images 122 caused by the screen, ambient lighting in the venue, etc.

Projector 80 may also include communication link 85 to transmit feedback signal 87. Communication link 85 may comprise a modem and a telephone line, a dedicated ISDN line, a TCP/IP link, or any other type of communication link known in the art. The feedback signal may thus be provided to a remote site for monitoring the quality of the displayed images. Further possible uses of the feedback signal may be to ensure accountability of the venue operator by verifying, for example, that the proper movie is shown at the scheduled times, etc. In this manner, movie theatre owners may also remotely verify the consistency of image quality among all of their theaters, and may ascertain the need for equipment maintenance or repair at any one of the particular theaters.

Also in response to the feedback signal, image data signal 99 may be adjusted by, for example, specifying a different conversion table 96 to be used to adjust image data 91. Additionally, if none of the conversion tables residing in projector 80 can properly adjust image data 91, a custom conversion table may be provided to the projector via communication link 85. In one embodiment of the invention, image data signal 99 is also provided to projector 80 via communication link 85, and may thus be provided in real time at the scheduled time for displaying the images (e.g. movie) or downloaded just prior to the scheduled performance. In such an embodiment, a custom conversion table may be incorporated into metadata 93, or simply added to image data 91 in addition to metadata 93, and may then be extracted by controller 98 from image data signal 91 and provided to image adjuster 94.

The ability to provide custom conversion tables may also greatly reduce or eliminate altogether the need for field technicians to visit the venue to adjust the projector. Thus, in one method of use of the invention, a series of tests may be conducted on projector 80 at any desired frequency (e.g. daily, weekly, etc.) and an appropriate set of conversion tables 96 downloaded for later use in adjusting image data 91 in accordance with detected characteristics of the projector, the screen, and the venue. The test or tests may rely on the feedback sensor 92 to provide feedback signal 87 to a remote location where the current characteristics of the projector are determined from the information contained in the feedback signal, the known image data provided for the tests, and the differences therebetween. In one embodiment, the test simply consists of displaying the image data 91. In another embodiment, specialized images such as monochromatic shapes may be displayed on various portions of screen 83, to measure the response to different colors as well any variations across the screen. Additionally, as mentioned previously, tests may be run displaying single pixels to determine if the projector is focused properly onto the screen. Any other of a number of tests may also be employed with feedback sensor 92.

In a further use of the invention, a system is provided for managing the production and distribution of digital cinema projects to permit accurate management of production values to enable accurate and measurable control. Thus, metadata 93 may include a test signal to assist the projector operator in insuring the projector is indeed set to the intended look in the event of any creative lighting applied or effects used that would create an unnatural look to the scene. The test signal may encompass elements that determine White level, Black level, Grey steps, Frequency response and linearity as well as sound parameters. Chroma channels may exhibit similar signals including a bar pattern that can be used to insure the best colorimetry is maintained.

The test signal may be inserted on an active but unused line of video to track and monitor the video image's signal level and quality throughout the mastering and replication process. The image quality is therefore measurable by referencing this signal. This same model can be applied to audio and digital cinema.

When capturing an image with a digital cinema camera, test signal data can be inserted and recorded along with the active picture and sound. This test signal data may serve as a reference for the sound and picture quality and associated technical parameters. The post production process may involve such things as "timing"or changes to color balance and component signal levels in order to produce finely tuned images and sound. At any time throughout the production and post-production processes, one can return a scene to the original image capture levels by referencing the test signal data and adjusting levels to their original state. For scenes used in special effects, the test signal data can be used to control levels and maintain continuity between like scenes.

Applications of this test signal data in the creation of the digital master may include:
  Creation of the High Definition or Super High Definition Digital Master;
  From Digital source to Digital;
  From Digital source to Film; and
  From Film source to Digital.

The test signal data generator may also be incorporated into the audio/visual capture device on the set, therefore eliminating the need for a separate piece of equipment to generate the test signal data.

In a still further aspect of the present invention, test signals may be added to entertainment distributions such as analog media, digital media and optical media. The test signals may be used to align the home entertainment system of a user to reproduce the intended theatrical performance.

In another still further aspect of the present invention, test signal data may be added to entertainment venue distributions using analog media, digital media and transmissions, and optical media and transmissions however distributed. The test signal data may be used to align the venue entertainment system to reproduce the intended performance and one or more feedback channels may provide the distributor or creator information or control of the characteristics of a performance.

Although the above embodiments have been described within the context of a movie theater, it must be understood that the inventive concept presented herein may be equally applicable to any other venue wherein images and sounds are presented in response to digital data input. Thus, a system according to the present invention may be an information-based technology that enables optimum playback of digitally encoded audio and video for both the home and cinema. The present inventive technique achieves this by means of information provided by data pre-encoded at the time of origination, or from post analysis of the audio and video data-streams (real-time or off-line). The methodology of the present invention, which can be implemented in hardware or software, may in general be adapted to match the requirements of the end customer including:
  TV program originators
  TV program providers
  TV broadcast distribution
  Film and Video directors
  Film and Video studios
  Film distributors
  Music program originators
  Music program providers
  Music distribution (CD, DVD, Internet)
  Radio program originators
  Radio program providers
  Radio broadcast distribution
  Computer game originators
  Computer game providers
  Computer game distributors
  Cable and satellite distributors
  PC manufacturers
  Professional equipment manufacturers
  Consumer electronics manufacturers
  Professional consumer
  Domestic consumer
  Home networking equipment manufacturers With the proliferation of video devices in automobiles and airplanes, systems according to the present invention may also be applied to these venues. Thus, in one embodiment, a system according to the present invention may down load information regarding the parameters of a particular audio or video presentation and adjust the output streams in accordance with these parameters and the known characteristics of the particular automobile, the audio/video equipment in the automobile, and other variables such as travelling speed, cabin noise, etc. A system according to the present invention may also:
  Maximize the performance of all components within the car's electronic 'network' by creating a reference standard by which the components must perform, with respect to the current and future THX Specification standards.
  Download new settings for component replacement &/or upgrades in after market segment.
  Dynamically adjustable compensation for road, wind, and motor noise contaminating the passenger compartment.

Compensation for the change in perceived frequency response in relation to volume settings with adaptive frequency response curves.

Selecting the appropriate Digital Signal Processing according to the artists intentions.

Link 'smart' components such as cellular phones, GPS devices, video games, and other video devices to maximize the inter-operative performance.

Ease of use through a 'one button' reset to reference standards set by THX and the artist's preferences.

Video benefits include:

Dynamic adjustment of video display relative to ambient light within a vehicle to adjust contrast and brightness of the viewing device.

Resolution adjustment for high resolution DVD and lower resolution video game play to stabilize color and clarity.

A system according to the present invention may thus be configured to provide:

A means for protecting the artistic intent of the program originators;

Quality assurance procedures for all media origination (Film/Broadcast/Video Production/Music Recording);

Quality assurance procedures for distribution systems (DVD/Satellite/Cable/Broadband Internet);

Real-time monitoring of hardware and software for digital cinema and broadcasting;

Auto-setup of audio and video replay for the home user;

Power saving strategies for minimizing the power consumption of line or battery operated equipment;

Auto-setup for digital cinema and broadcast hardware; and

The means, for domestic or professional users, of automated modifications to the audio data-stream, to prevent audible distortion or equipment damage during playback.

Benefits of a system according to the present invention may also extend to equipment manufacturers, venue operators, and consumers, as well as the artistic community. Equipment manufacturers can guarantee the color fidelity of images displayed using their projectors if the projectors incorporate technology according to the present invention, regardless of the venue they will be used in. Furthermore, field service requests for calibration and alignment of the equipment may be sharply reduced.

To the creative community, the benefits are somewhat more subjective, and may include:

A movie may look the same in every theatre. Feedback from the actual screen image may allow the projector to compensate for color variations due to the lamp reflectors, lenses, screen aging, and the like, and even for lamp aging to a certain extent. Beyond the lamp age limits, the system may report the low light level and flag it as a problem to be fixed.

A movie may look the same on projectors using different display technologies. An image adjuster according to the present invention may manipulate the incoming image data for each projector technology so that it looks the same on the screen.

A movie may look the same in the future as it does now, regardless of any changes in display standards. A metadata carried with the image files may define the color standard under which the image was mastered and displayed originally. Even when color standards change, an image adjuster according to the present invention may adapt the projector back to the original color space for the movie being displayed.

The color rendition of the projector can be manipulated to better achieve a certain "look." Just as some film is processed differently to achieve a special look (such as bleach bypass), a digital projector can be aligned to render images otherwise not easily achieved, thus affording more creative freedom.

The director can change his mind: the color of the movie can be changed after the data files are delivered to the theatre. A new color matrix reflecting the director's current wishes can be downloaded over a network connection, such as the Internet, to the projector at any time before, during, or after a showing.

The color can be changed dynamically during the showing. This could be used to implement the above-mentioned "look" in only certain scenes in the movie.

Consumer benefits may include:

Easily perceived quality difference;

Easy to setup;

Easy to use;

Easy to confirm correct operation;

Easy to upgrade;

Increased reliability;

Consistent product performance;

Increased product versatility;

Increased performance/price ratio;

Increased battery life for portable audio amplifiers; and

Higher performance portable audio equipment.

A system according to the present invention may provide a method of maintaining the program creators' intention and art through the encoding at capture of the signal, then through active control and compensation of the delivered program material in the following areas of display; Post Production, Digital Cinema, Broadcast, Pay Per View, Digital Download, Data Conversion, Optical Media, Internet delivery and other methods of delivery of audio and/or video.

A home presentation system may consist of components such as Audio/Video Receiver, Optical Disc player such as DVD, various types of receiving terminal type devices such as cable or DBS receivers, and a Video display device which may be of various technologies such as direct view CRT, rear screen projection, front projection, plasma screen and LCD projection. A display alignment system according to the present invention may provide a method and technologies which integrate into various home devices which allow the adjustment of sound and or display parameters such as the color balance of the various display systems to maximize the benefit of the application of the methods and apparatus of the present invention to the creation and distribution of audio visual works.

Figure 5:
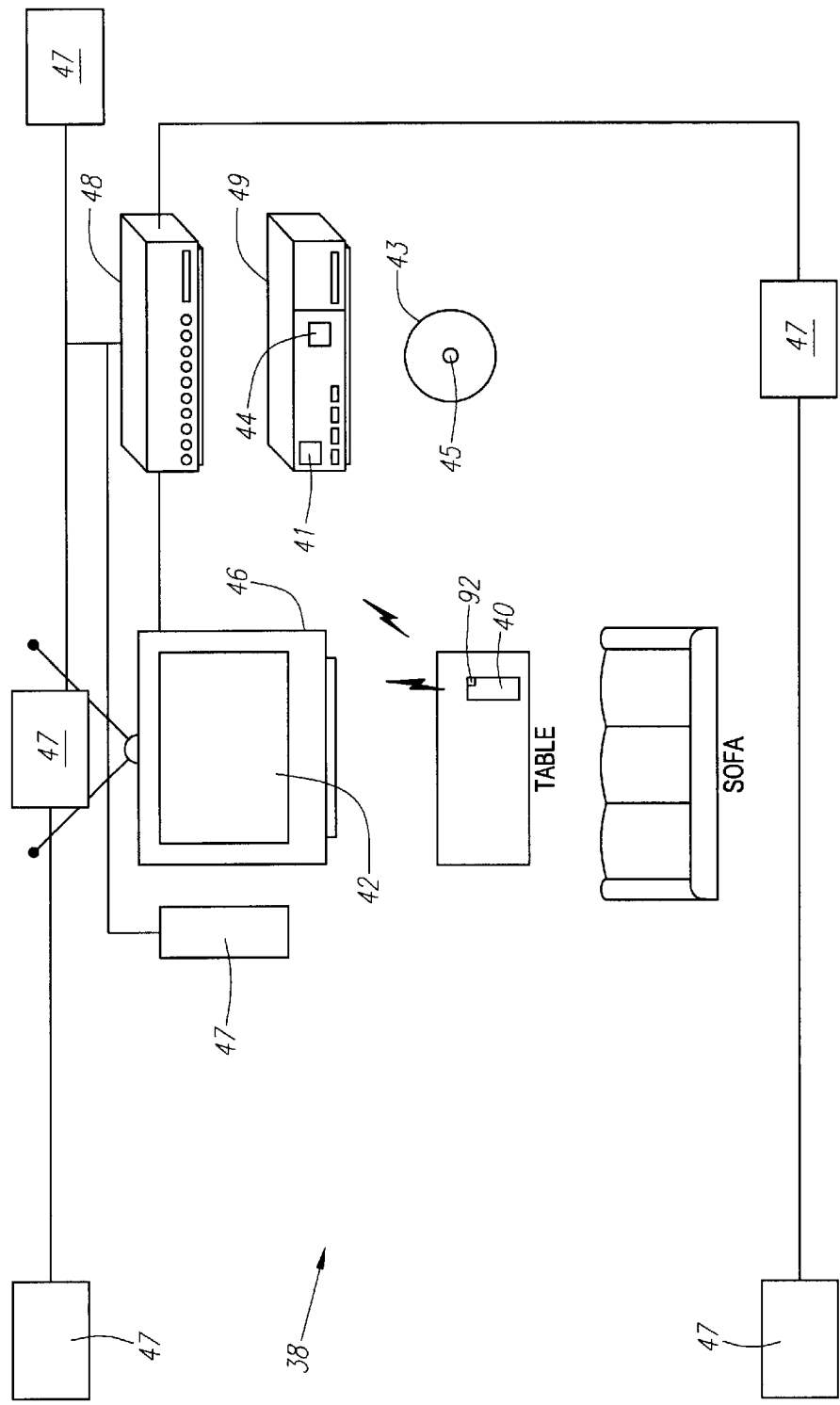
FIG. 5 is a block diagram of a home entertainment system according to the present invention.

Referring now to FIG. 5, entertainment system 38 according to the present invention having viewing area 38A may include a sensor 92 to be integrated in a home entertainment system remote control 40 which may provide a feed back mechanism to a programmed test sequence 42 or other look up system 44 built into the display device 46 or other system element 48. Performance parameters of the system such as the light levels detected by the sensor 92 would be communicated via an RF or IR digital code 39. Sound from reproduction elements 47 may also be detected. This system can be integrated with manual tuning as well to insure all parameters are met. This part of the system is to establish a display result to a known source signal internal in the display device.

Another part of this system is to establish a desired result from the various system devices such as DVD players and other system elements. For example, in DVD player 49, video level alteration may be possible as part of feature set 41. A DVD player or other system device according to the present invention may auto adjust to insure an optimum setting is maintained during a playback of file or media such as DVD 43 encoded with test parameters 45 or other standard. A similar set of signals can be generated from the output of the DVD, cable or DBS set top box and any other type of terminal equipment to provide the adjustment of input levels either at the output of the individual device, A/V receiver, or at the Monitor input using the same light sensor contained in the remote control unit.

The intent is not only to provide a display adjustment provision, but to also include a method to utilize the same device to achieve a system wide approach. This would involve integrating these technologies into each device mentioned as part of the overall technique. Thus sound and possibly ambient lighting control may also be included.

Referring now to FIG. 6, a digital test program added to a digital media such as DVD may include test election element 50. Element 50 may be used to initiate a calibration test process to adjust one or more playback elements (see below). Any other suitable method or device may be used to initiate a playback calibration.

Referring to FIG. 7, a playback calibration according to the present invention may include one or more elements. In a currently preferred embodiment of the present invention a playback calibration includes a video calibration and an audio calibration. Using a test selection menu such as menu 52 each test element may be selected using test selectors 54 and 56.

Video calibration according to the present invention may include multiple elements. Referring now to FIG. 8, a first element of a video calibration may include aspect ratio test and setting. In a currently preferred embodiment of the present invention window 58 is used to prompt a user to adjust the aspect ration of the playback system. Video calibration may also include calibration of other characteristics of the video display such as calibration of brightness, contrast, color or chroma, and tint or phase. In a currently preferred embodiment of the present invention brightness, contrast, color and tint are calibrated.

Referring now to FIG. 9, a window such as window 60 may be used to prompt a user to adjust video controls to calibrate selected aspects of the video display. Window 60 may be used to prompt a user to adjust brightness, contrast, or tint and color. Tint and color may be adjusted using a combined window. In a currently preferred embodiment of the present invention the order of calibration should be contrast first, brightness second, and then either tint or color.

Figure 10:
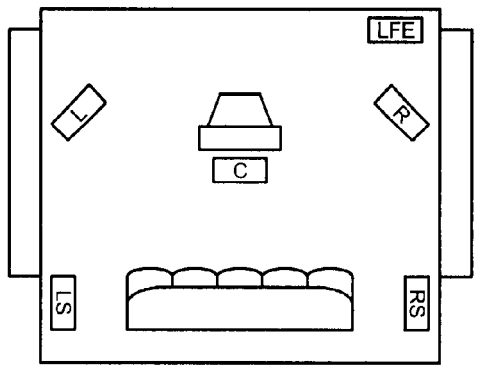
FIG. 10 is a speaker phase test window according to the present invention.

Sound calibration may also include multiple elements or calibration tests such as channel volume tests, phasing tests and crossover tests. Referring now to FIG. 10, a window such as window 64 may be used to initiate audio tests. Selection of test start element 66 may initiate a test sequence. Channel volume tests may test each channel of the playback system to calibrate the volume.

Figure 11:
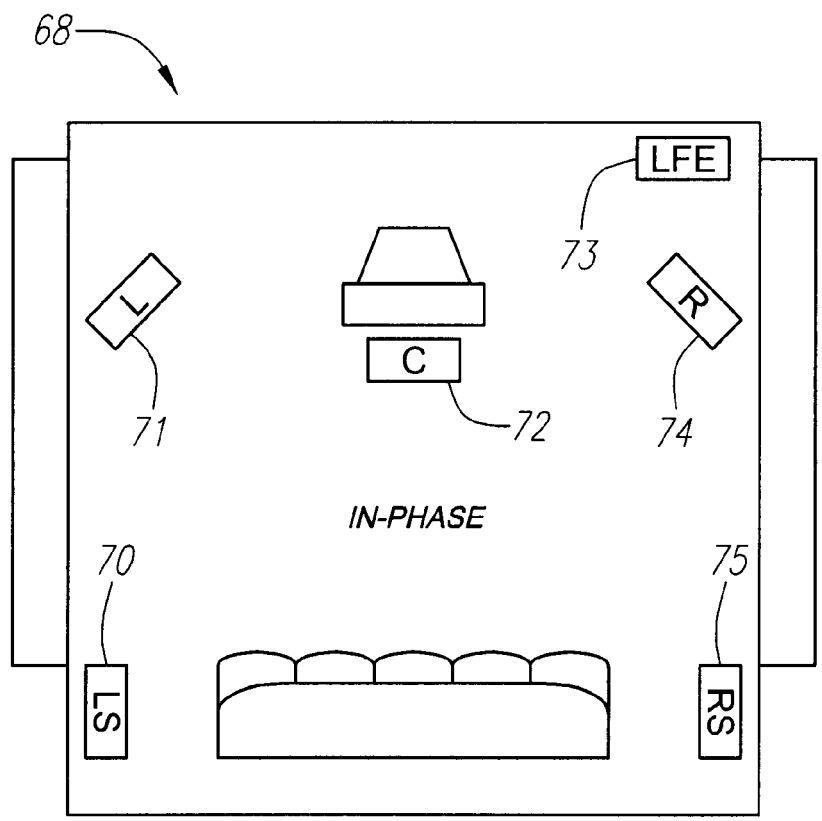
FIG. 11 is a speaker phase diagnostic window according to the present invention.

Referring now to FIG. 11, a calibration window 68 according to the present invention is shown. Calibration window may contain representations of audio playback elements such as elements 70, 71, 72, 73, 74 and 75. Upon initiation of a calibration, a sound or series of sounds may be reproduced using one or more of as elements 70, 71, 72, 73, 74 and 75 and a user may be prompted to perform adjustments according to characteristics of the sound perceived by the user. The characteristics may include absolute sound level, relative sound level, and relative phasing. Additionally a crossover calibration may be performed. In a currently preferred embodiment of the present invention a crossover calibration is performed between 20 and 200 Hz.

Figure 12:
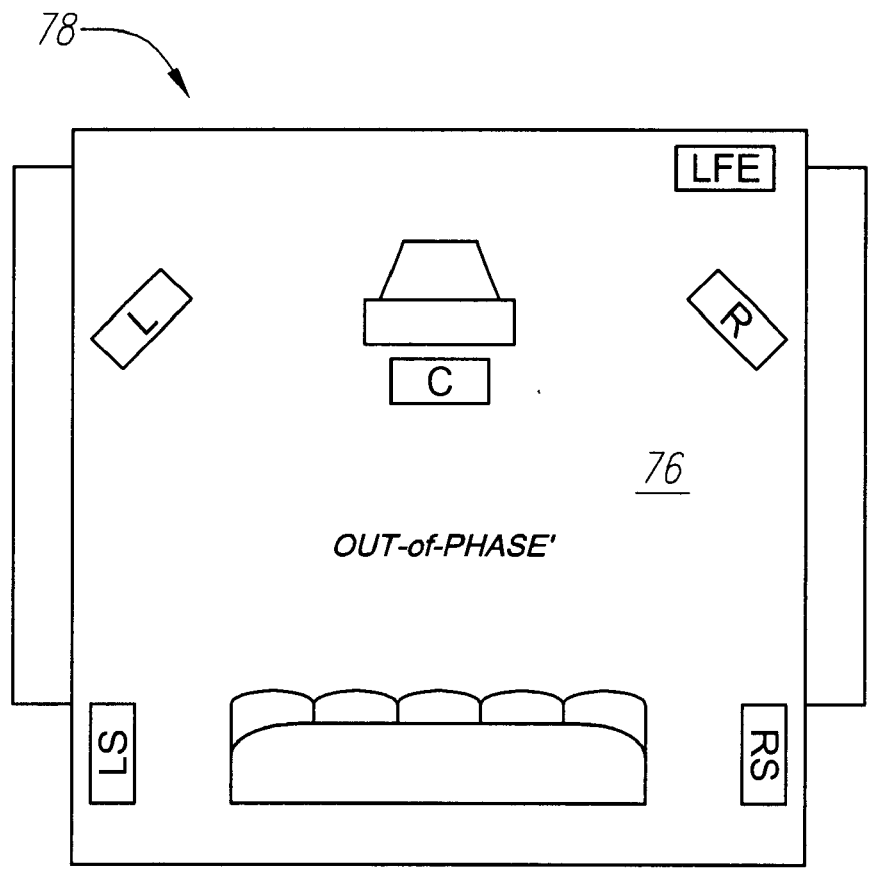
FIG. 12 is a second speaker phase diagnostic window according to the present invention.

Referring now to FIG. 12, a calibration window 76 may include one or more user prompt messages 78 to indicate suboptimal performance and/or to suggest correction measures.

Figure 13:
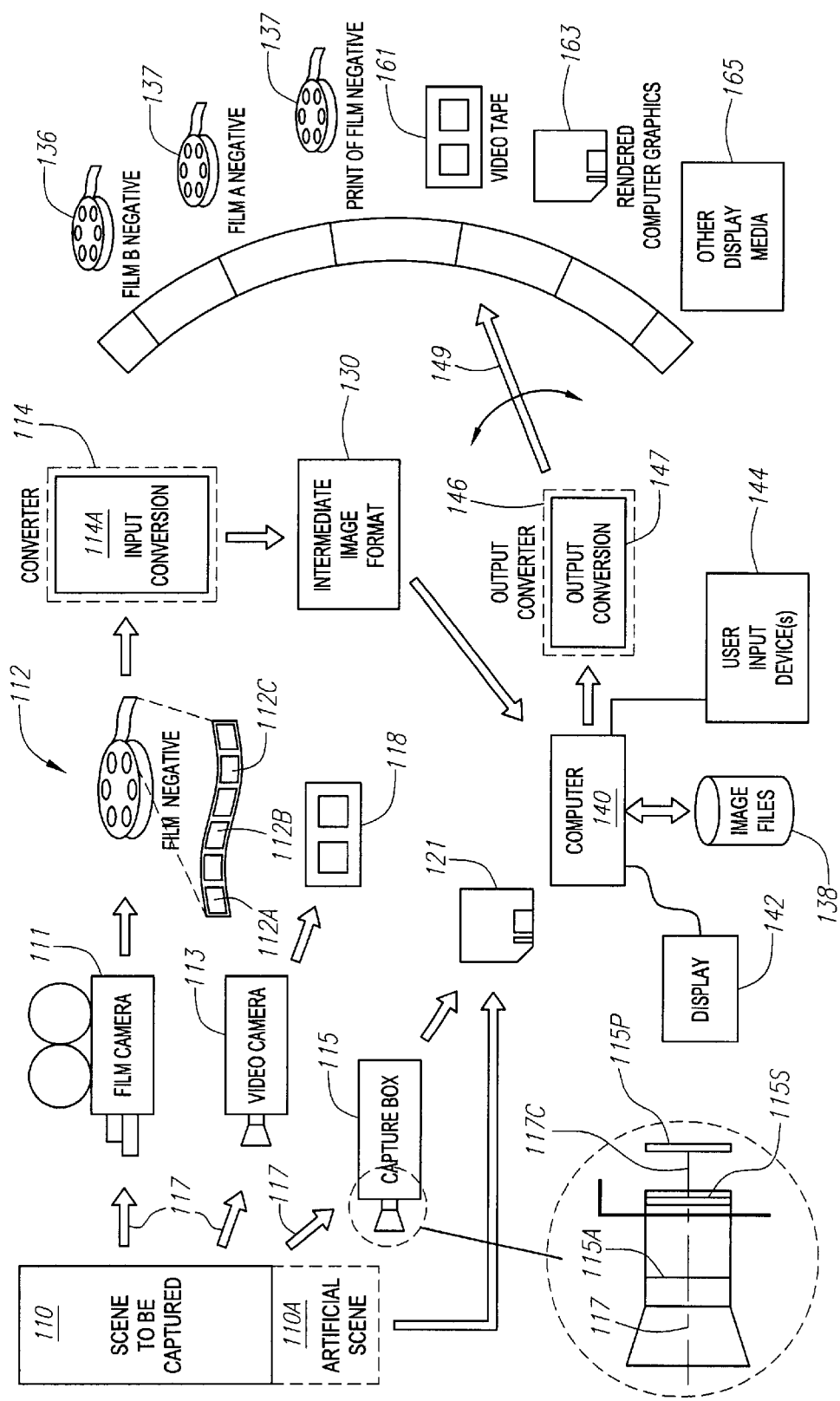
FIG. 13 is a block diagram of a currently preferred embodiment of the present invention.

Referring now to FIG. 13, scene to be captured 110 is illuminated and an image capture devices such as film camera 111, video camera 113 or capture box 115 may capture reflected light 117 and generate an image therefrom on image storage media such as film 112, video tape 118 and digital media 121 respectively. Alternatively, scene to be captured 110 may be an artificial scene 110A, such as a computer generated and rendered scene, which may be stored directly on some media, such as digital media 121. The intensity of reflected light 117 may be controlled by exposure controls, such as aperture 115A and shutter 115S. Different capture devices may use different techniques to control the intensity of captured light 117C at capture point 115P. Film camera 111 captures images on film 112 which includes one or more images such as images 112A, 112B and 112C for processing. Input image conversion 114A is performed by converter 114. During input processing such as input image conversion 114A, an image such as image 112A is digitized and normalized to counteract the input transform function of the image capture or generation device such as film camera 111 and the storage media used. Once an image is normalized, the resulting intermediate format file 130 may be stored in computer memory 138 and may be manipulated using computer 140, display 142 and one or more user input device such as user input device 144.

When an image or images are to be output, an output conversion 147 may be applied to the intermediate format file 130 of the desired image or images. The output conversion is applied by output converter 146. In some cases, output conversion 147 is the inverse of an input conversion such as input image conversion 114A used to counteract the capture media input transfer function. By using an intermediate format file such as intermediate format file 130 and controlling the conversion of output file 149, images captured or originating on disparate media may be readily combined and may also be transferred to completely different media such as film negative stocks 136, 137 or film print stock 139, or video 161 or digital storage media 163 or other display media 165 while maintaining the fidelity of the image or images.

Image capture media and devices, such as film 112, video camera 113 or capture box 115, have a transform function that may be measured. Similarly, artificial image creation and rendering techniques and display devices include one or more transform functions. The transform function is a measure of the response of the device such as film 112 to the intensity of captured light 117C, or it may be a measure of the input or driving voltage or digital value necessary to develop an image brightness for image display devices. According to the present invention, the process of reversing the transform function of a capture, creation, storage or media element is image conversion as practiced by converter 114.

Figure 14:
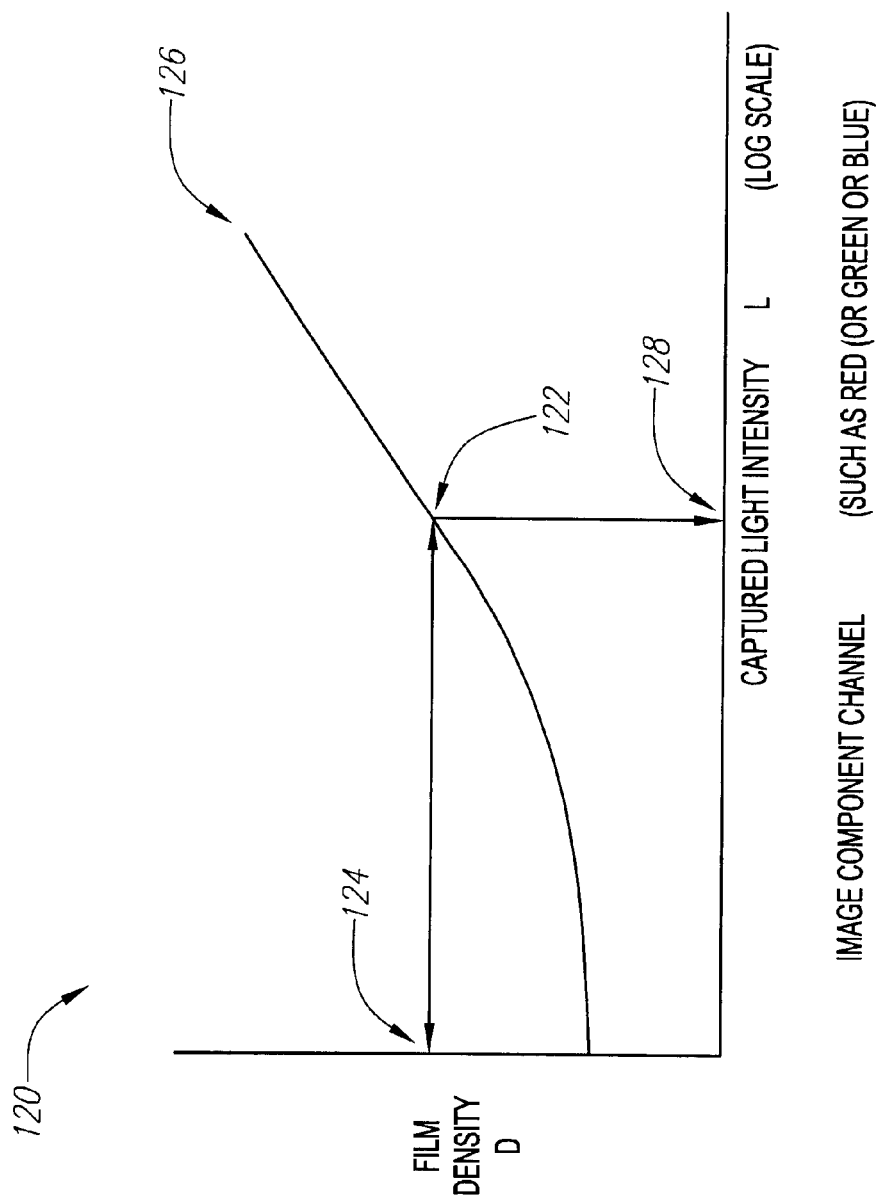
FIG. 14 is a sample graph of image density to exposure.

Referring now to FIG. 14, an image transform function as used by the present invention is shown. By following a reverse transform of the conventional transform of light to film density, the present invention may use the captured scene light intensity to scale intermediate image files such as intermediate format file 130.

Image capture, creation and storage is generally accomplished using multiple image component channels such as a red channel, a green channel and a blue channel in a conventional RGB system. Other image component channel techniques such as YUV or other multi-spectral schemes may be used with the present invention.

For example, in a conventional RGB system, a red channel 120 of image 112A may have a point 122 with an image density 124 which may be reverse transformed through response curve 126 of the device, such as film camera 111 used to capture or create image 112A, to show that at point 122 in the scene to be captured, captured light 117C had intensity 128 at capture point 115P. By using response curve 126 in reverse, intermediate format file 130 may be a direct representation of reflected light 117. Thus, if an image of scene A having captured light intensity X is fixed on a first media and digitized according to the present invention, the digital file would have a file brightness factor Y. An image of scene B having captured light intensity 2X is fixed on a second media and digitized according to the present invention would have a file brightness factor twice as large as the brightness factor of scene A, or two times Y. Transform characteristics such as FIG. 2 may be obtained from the media manufacturer or by testing. Testing may yield more accurate results.

The exposure characteristics of film stocks and video CCDs and other image capture devices and the display characteristics of image display and creation devices may be mapped to a intermediate digital image format in such a way that regardless of how an image is captured, created, or stored, a unique intermediate digital image or file is created that has a direct relationship to the captured or virtual scene light intensity. Digital files such as intermediate format file 130 are Digital Intermediate Media Elements or DIMEs. Since a Dime is a mapping of the actual captured scene light intensity or virtual scene light intensity such as the intensity of reflected light 117, a film negative or other image storage media produced from a DIME such as negative 136 becomes identical to the original image on the original storage media, film 112.

Figure 15:
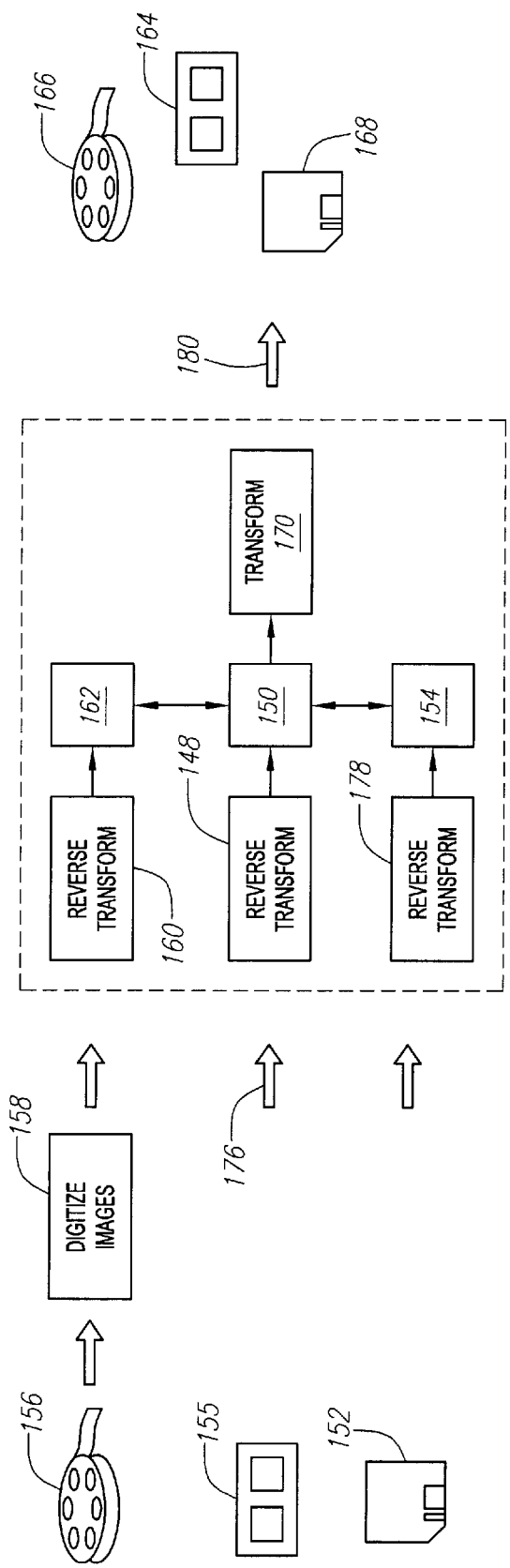
FIG. 15 is a block diagram of the present invention showing the steps from conventional image storage to DIME files and back to conventional image storage.

Referring now to FIG. 15, an image originally captured on video tape 155 may be scanned at step 176, undergo reverse transformation 148 and produce intermediate format file 150. Similarly, output files 152 of a computer graphics renderer may be mapped at step 178 to produce intermediate format file 154 and negative stock 156 may undergo digitization 158, reverse transformation 160 and produce intermediate format file 162. Intermediate format files 162, 150 and 154 may be combined and manipulated easily due to their common linear characteristics and the combined results may be output through a transform 170 to the corresponding media such as negative 166, second video tape 164 or digital storage media 168. Further, the digital input scanner such as digitizer 158 and the output recorder such as recorder 180 may be calibrated to allow scanning in one film negative stock 156, recording to a second negative stock 166, thereby creating a new negative of identical printing density to negative stock 156.

An intermediate format file, such as intermediate format files 162, 150 or 154, may use any binary format. In a currently preferred embodiment of the present invention, a DIME uses 16 bit numbers for efficiency running on a computer such as computer 140 of FIG. 13. Eight bit numbers may also be used, where processing and storage overhead are not limited or absolute precision is required. Alternatively, 32 bit, 64 bit or larger numbers may be used to yield greater precision. Color correction is another facet of image production that is affected by the present invention. Color correction may easily be accomplished by manipulating intermediate format files, such as intermediate format files 162, 150 and 154. This technique is performed on digitized files and as such data discarded may not be recovered. In a currently preferred embodiment of the present invention, color correction is performed on source images such as negative 156 and video 155 to yield a intermediate format file having maximum detail.

Further, all analog and digital paths from film scans to an intermediate format file, and output paths from an intermediate format file to a film negative such as negative 166, as well as film projection, CRT display and electronic projection are corrected in a way that alters the data only on the path from the film scanner to the intermediate format file and on the path to the film recorder, to the workstation display monitor, or to the video display system. The technique for this includes passing data both through hardware and software lookup tables. Further, the lookup tables employ independent correction for each of the multiple image component channels such as the three RGB color channels and may be either linear, non-linear, matrix, lattice or some other transform or combination of transforms as required.

Figure 16:
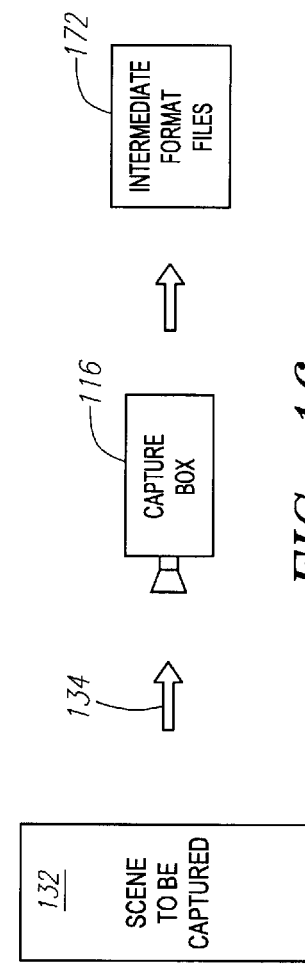
FIG. 16 is a block diagram of an alternate embodiment of the present invention.

Referring now to FIG. 16, in another embodiment of the present invention the digitization of the capture device and the reverse transformation of the capture media may be included in a digital capture device 116. The output of digital capture device 116 is intermediate format file 172 which may be output or stored in any conventional digital manner. By including digitization and reverse transformation in capture device 116, intermediate format file 172 may directly represent light intensity 134 reflected by the scene to be captured 132.

Referring now to FIG. 17, still another embodiment of the present invention provides a technique for previewing an image on a second media as it will appear as if embodied in a first media. The simulation technique derives from the reverse transforms described above. By identifying media transform characteristics such as those of FIG. 14, intermediate format files such as intermediate format files 162, 150 and 154 may be transformed for output to various media such as film negative 166 of FIG. 15. The final output or target image of intermediate format file 150 may be applied to film negative 166 of FIG. 15, but during the production process it is desired to preview the image represented by intermediate format file 150. The preview is displayed on computer display 142 of FIG. 13. Intermediate format file 150 may be transformed by the transform curve for film negative 166 and then simulation 174 of the screen image for viewing on a computer display is accomplished by transforming target image 176 by the transform characteristics of display 142.

Referring now to FIG. 18, in another aspect of the present invention, a technique is provided to permit intermediate format file 182, targeted to display on film or a workstation, to be transformed at 184 for the target media. Simulation transformation of target image 188 is accomplished at step 186 to permit the image to be previewed on video tape 190 with the characteristics of target image 188. Transforms such as transform 184 and simulation transform 186 may include the transforms of film negative stocks and print stocks, as well as the display characteristics of display devices and their phosphor such as display 142 of FIG. 13. Also mapped are graphics display interfaces, RGB frame buffers, YUV frame buffers, component digital video monitors and any other elements of image capture or display that transform the image. Transform 184 and simulation transform 186 are separated here for clarity of explanation. In practice, transform 184 and simulation transform 186 may be concatenated for computational efficiency.

Figure 19:
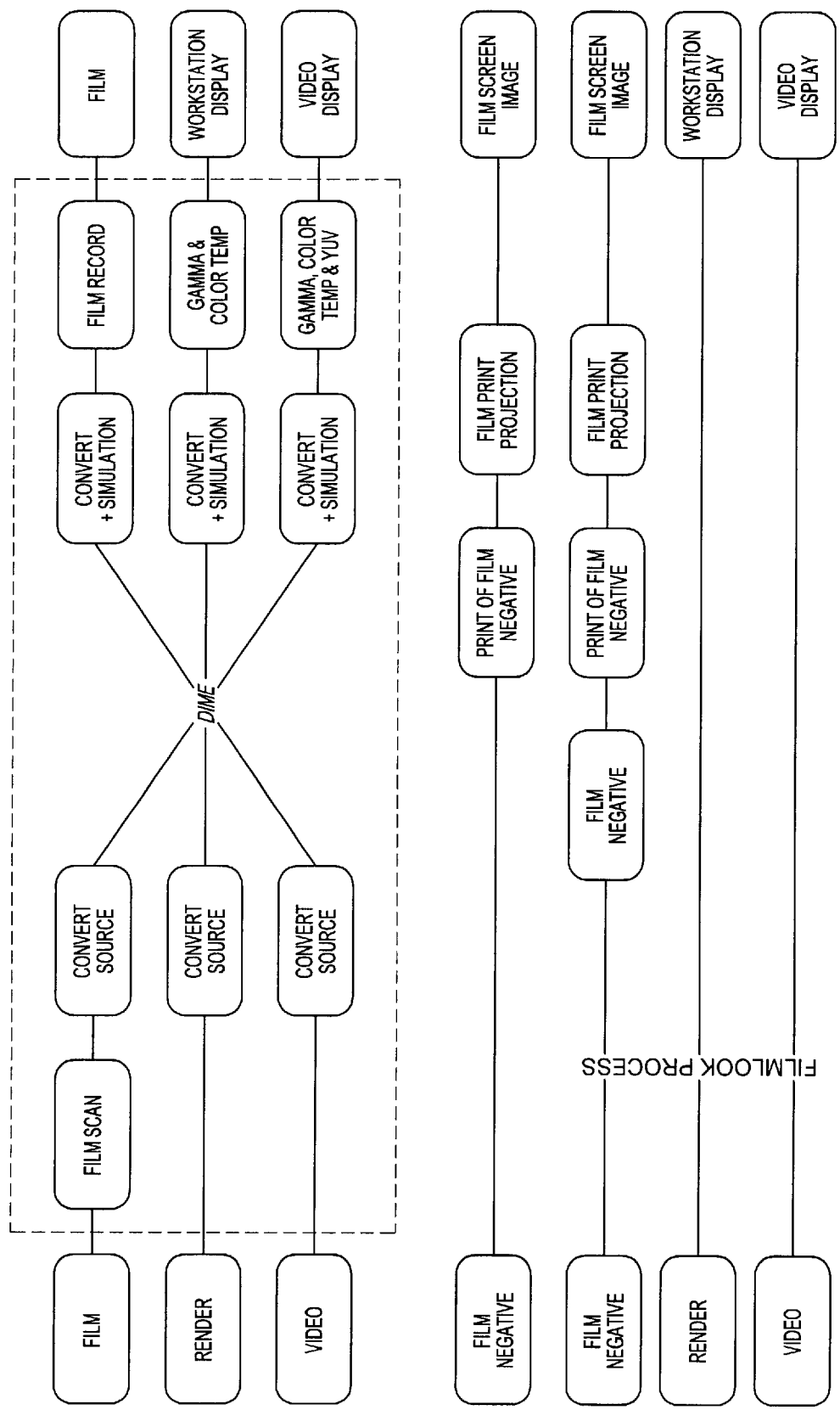
FIG. 19 is a block diagram of the process steps of the present invention.

FIG. 19 shows respective processes that may be included in embodiments of techniques for previewing an image on a second media that will be embodied in a first media with, in accordance with various embodiments as described elsewhere herein.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

We claim:

1. A method of presenting an audio visual work comprising:
   capturing audio-visual content;
   capturing data representing first characteristics of the content;
   combining the content and the captured data as enhanced content;
   using the captured data to process the enhanced content to produce final content having second characteristics;
   displaying the final content; and
   using the captured data to adjust the display of the final content to reproduce the second characteristics.

2. The method of claim 1 wherein said capturing data representing first characteristics of the content comprises:
   capturing data representing two or more first characteristics of the content.

3. The method of claim 1 wherein said capturing data representing first characteristics of the content comprises:
   capturing data representing video characteristics of the content; and
   capturing data representing audio characteristics of the content.

4. The method of claim 3 wherein said capturing data representing video characteristics of the content comprises:
   capturing white level data.

5. The method of claim 3 wherein said capturing data representing video characteristics of the content comprises:
   capturing black level data.

6. The method of claim 3 wherein said capturing data representing video characteristics of the content comprises:
   capturing grey step data.

7. The method of claim 3 wherein said capturing data representing video characteristics of the content comprises:
   capturing frequency response data.

8. The method of claim 3 wherein said capturing data representing video characteristics of the content comprises:
   capturing image linearity data.

9. The method of claim 3 wherein said capturing data representing video characteristics of the content comprises:
   capturing luminance data.

10. The method of claim 3 wherein said capturing data representing video characteristics of the content comprises:
    capturing color level data.

11. The method of claim 3 wherein said capturing data representing audio characteristics of the content comprises:
    capturing sound level data.

12. The method of claim 3 wherein said capturing data representing audio characteristics of the content comprises:
    capturing frequency response data.

13. The method of claim 1 wherein said using the captured data to correct the display of the final content comprises:
    using the captured data to automatically correct the display of the final content.

14. A method of creating and displaying an audio-visual production comprising:
    capturing audio-visual content and first content characteristics as enhanced content;
    using the captured content to process the enhanced content to produce final content having the first content characteristics;
    displaying the final content; and
    using the captured content to correct the display of the final content to reproduce the first content characteristics.

15. The method of claim 14 wherein said capturing audio-visual content having first content characteristics as enhanced content further comprises:
    capturing audio-visual content;
    capturing data representing first characteristics of the content; and
    combining the content and the captured data as enhanced content.

16. The method of claim 14 wherein said using the captured content to correct the display further comprises:
    using the captured content to correct the display of the final content to reproduce second content characteristics.

17. Apparatus for creating and displaying an audio visual work comprising:
    means for capturing audio-visual content;
    means for capturing data representing first characteristics of the content;
    means for combining the content and the captured data as enhanced content;
    means for using the captured data to process the enhanced content to produce final content having second characteristics;
    means for displaying the final content; and
    means for using the captured data to correct the display of the final content to reproduce the second characteristics.

18. The apparatus of claim 17 wherein said means for capturing data representing first characteristics of the content comprises:
    means for capturing data representing two or more first characteristics of the content.

19. The apparatus of claim 17 wherein said means for capturing data representing first characteristics of the content comprises:
    means for capturing data representing video characteristics of the content; and
    means for capturing data representing audio characteristics of the content.

20. The apparatus of claim 19 wherein said means for capturing data representing audio characteristics of the content comprises:
    means for capturing frequency response data.

* * * * *